US006619816B1

(12) United States Patent
Johnson

(10) Patent No.: US 6,619,816 B1
(45) Date of Patent: Sep. 16, 2003

(54) ILLUMINATED NOVELTY CONFECTION

(76) Inventor: Richard Johnson, P.O. Box R, Del Mar, CA (US) 92014

( * ) Notice: Subject to any disclaimer, the term of this patent is extended or adjusted under 35 U.S.C. 154(b) by 0 days.

(21) Appl. No.: 09/538,329

(22) Filed: Mar. 29, 2000

Related U.S. Application Data

(60) Provisional application No. 60/126,719, filed on Mar. 29, 1999.

(51) Int. Cl.$^7$ ............................................... F21V 33/00
(52) U.S. Cl. ........................................ 362/253; 362/109
(58) Field of Search .............................. 362/109, 186, 362/202, 208, 253, 806, 190; 446/484, 485

(56) References Cited

U.S. PATENT DOCUMENTS

| | | | | |
|---|---|---|---|---|
| 4,914,748 A | * | 4/1990 | Schlotter, IV et al. | 362/806 |
| 5,860,732 A | * | 1/1999 | Coleman et al. | 362/253 |
| 6,050,697 A | * | 4/2000 | Bennington | 362/109 |
| 6,077,144 A | * | 6/2000 | Fishman | 40/442 |
| 6,135,606 A | * | 10/2000 | Fernandez et al. | 362/253 |

\* cited by examiner

*Primary Examiner*—Y. My Quach-Lee
(74) *Attorney, Agent, or Firm*—Burkhart & Burkhart; Anne K. McGovern Burkhart; Patrick N. Burkhart

(57) ABSTRACT

An illuminated confection assembly includes a light device, a light transmission element attached to the light device, and an edible confection attached to the light transmission element. The confection has an interior portion that is adapted and constructed to receive light from the light device via the light transmission element. The confection further includes a light passage arrangement which permits light to pass from the interior portion of the confection to the ambient atmosphere and thus be generally observable. The confection can be transparent or translucent, or may be opaque with light passages formed therein. In various embodiments, the confection assembly can include a tube with a reflective inner coating, a confection specifically designed to fit tightly on the tube, a light bulb, a battery, and a switch.

10 Claims, 6 Drawing Sheets

ILLUMINATED NOVELTY CONFECTION

CROSS-REFERENCE TO RELATED APPLICATIONS

This application claims the benefit of provisional application Ser. No. 60/126,719 filed Mar. 29, 1999.

STATEMENT AS TO RIGHTS TO INVENTIONS MADE UNDER FEDERALLY-SPONSORED RESEARCH AND DEVELOPMENT

None

FIELD OF THE INVENTION

The invention relates generally to illuminated novelty items. In particular, the invention relates to illuminated novelty confections such as lollipops.

DESCRIPTION OF RELATED ART

As marketers of hula hoops, pet rocks, and yo-yos will attest, the popularity of most children's items is fleeting at best. The item that the child could not live without last month, which the child insisted that the parent acquire at all cost, sits neglected and abandoned a short time later, spurned for the Next Big Thing. Despite this ephemeral spotlight, a few items endure as "classics", guaranteed to delight no matter what the latest fad may be.

Among these classics are flashlights and candy. The universal appeal of flashlights may stem from their simplicity. In the hands of a child, a flashlight can become a spotlight one minute, a light saber the next, and a medium for shadow-puppets soon thereafter. In most households with children, it is next to impossible to maintain a flashlight for emergencies without securing it out of reach of small persons. Similarly, the popularity of candy is well-documented, and its appeal to children almost proverbial.

Understandably, there have been many attempts to enhance the appeal enjoyment of these items. Confectioners have introduced candy that explodes, spins, plays music, and emanates from the throats of cartoon characters. Flashlights with sirens, swords, and signal lights have all come and gone in the marketplace.

There have been some attempts in the art to combine these concepts. One example is set forth in U.S. Pat. No. 4,914,748 to Schlotter, et al. The Schlotter patent is directed to an illuminated candy holding device. The device includes a replaceable candy cylinder attached to the end of a flashlight which is turned on to make the candy cylinder glow brightly while being consumed. It can be used as a wand, and after the candy has been consumed, the device can be employed as a miniature flashlight. The battery may be permanently sealed inside the case and is not replaceable. The device is provided with a removable clear plastic cover which is placed over the candy and which is secured in place at one end, for protection and storage of the candy, by the flashlight end connector.

Another example is U.S. Pat. No. 5,471,373 to Coleman, et al. The Coleman patent is directed to a candy sucker holder entertainment device in which a light flashes pulses of light onto a candy sucker users face to the beat of music or as sounds made by an integrated circuit loaded with the different sounds. A switch is operated to activate the integrated circuit for the different sounds. The device is used mainly by children for amusement during eating a candy sucker.

There is a significant degree of amusement value provided in the devices described in these patents. However, it will be apparent to those of skill in the art that the opportunity exists for enhancing further the amusement and commercial viability of such products. For example, the shape of a lollipop on a "stick" is one with which consumers are manifestly satisfied. However, known illuminated lollipops either illuminate the candy portion from the outside (as in the Coleman patent) or alter the configuration of the candy (as in the Schlotter patent). Additionally, known devices fail to provide adequate media for advertising or other indicia, which would greatly affect the commercial versatility of the device.

It can be seen from the foregoing that the need exists for an illuminated confection that overcomes the shortfalls of known arrangements in this technology.

SUMMARY

In accordance with the principles of the present invention, an illuminated confection assembly is disclosed. The confection assembly includes a light device, a light transmission element attached to the light device, and an edible confection attached to the light transmission element. The confection has an interior portion that is adapted and constructed to receive light from the light device via the light transmission element. The confection further includes a light passage arrangement which permits light to pass from the interior portion of the confection to the ambient atmosphere and thus be generally observable.

The confection can be transparent or translucent, or may be opaque with light passages formed therein.

In various embodiments, the confection assembly can include a tube with a reflective inner coating, a confection specifically designed to fit tightly on the tube, a light bulb, a battery, and a switch.

There are several designs, each with different mechanisms and switches to activate the light. One embodiment of the invention is designed to have a hollow tube with a reflective coating on the inside which is also the holder or handle for the confection. Another embodiment calls for the placement of a well-fitted two layer foil/paper piece rolled up and slid inside the tube. When rolled and placed inside the tube, the paper/foil piece will create a tension inside the tube which will hold it in place. The reflective foil has paper affixed to one side will create the spring tension necessary to keep the aluminum foil/paper tightly fitted to the inside of the tube as it is rolled like a poster or map in a cylindrical tube. The paper side of the paper/foil piece may contain writing or messages to be discovered after the pop has been removed or eaten.

In another embodiment, the confection with the tube attached slides over a common pen light. Another embodiment includes a light device that is mechanically affixed to the tube. Potential hazards or safety issues regarding the lighting aspects, batteries, bulbs or fiber optics are also addressed. The confection assembly can be provided with indicia such as messages or logos, and can take virtually any shape or color, or any possibility or combination of flavors. Frozen confections, even chocolate designs with holes allowing light to pass-through, are contemplated.

The confection does not necessarily have to be limited to candies, and could include virtually anything edible. It is contemplated that the illuminated confection could be formed as artificial foods such as plastic grapes or strawberries, or as other objects, any of which may be provided with scent or topical flavoring agents.

In addition to the entertainment value of the present invention, there are practical aspects as well. For example if a child in a crowd at night were difficult to find, the child could be instructed to hold up a "Light Pop", which would help parents or guardians find the child easily.

From a usage or demographic perspective, there are several possibilities including children's candies, specialty concessions, novelties, premiums, advertising and contest marketing. If the light transmission element is provided as a sealable tube, sales information or promotional material for other products, "secret messages", horoscope, or virtually any message, advertisement, map, logo, prize information or other printed material can be included with the confection assembly. In an embodiment, the messages can be seen only by using the remaining light after the confection has been consumed or removed.

The invention itself, however, both as to organization and method of operation, together with further objects and advantages thereof, may be best understood by reference to the following description taken in conjunction with the accompanying drawings.

DETAILED DESCRIPTION OF PREFERRED EMBODIMENTS

Figure 1:
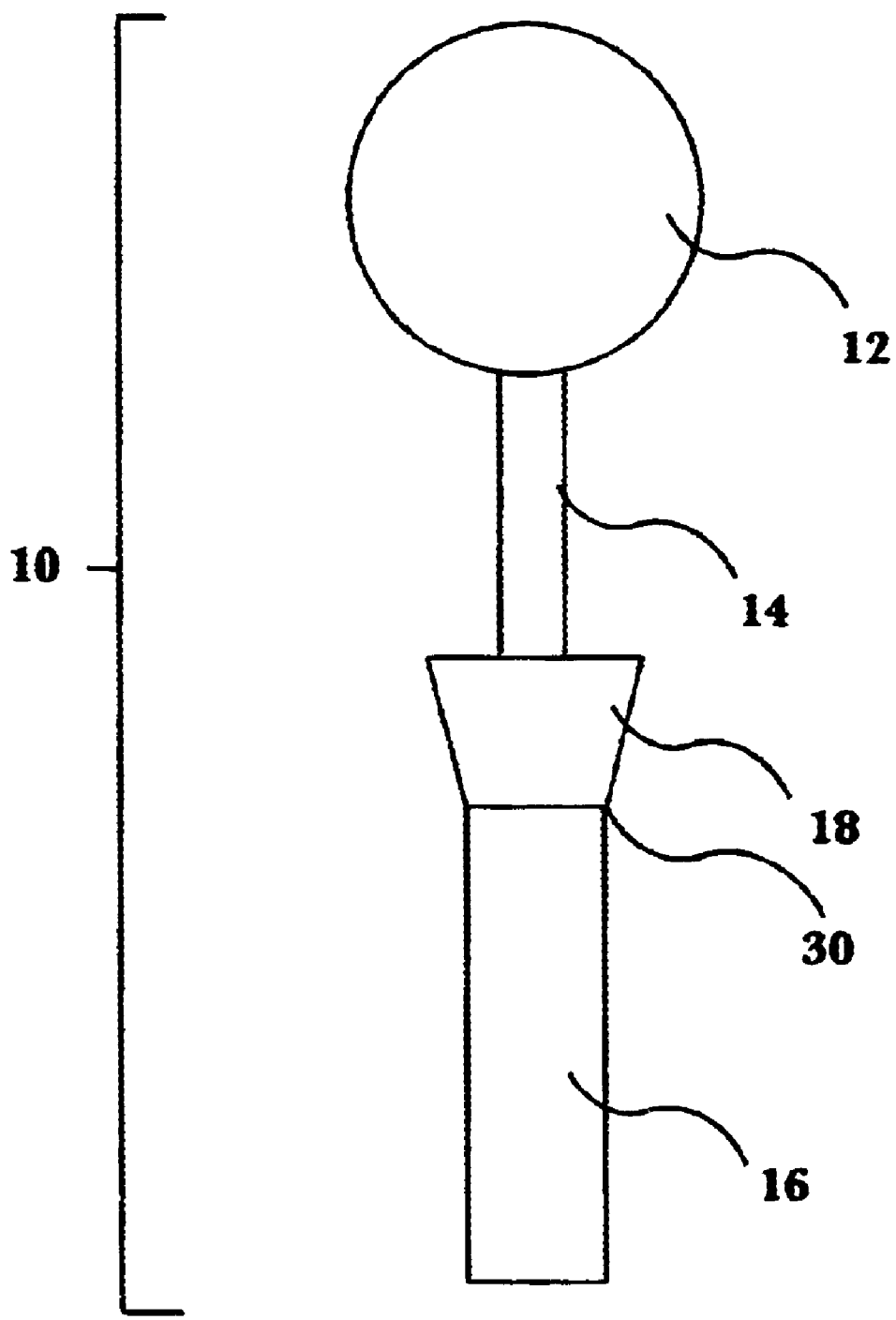
FIG. 1 is a schematic view of a confection assembly in accordance with the principles of the present invention.

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described.

A confection assembly 10 in accordance with the principles of the present invention is illustrated generally in FIG. 1. A confection 12 is connected to a light transmission element 14, here provided as a tubular member. The light transmission element 14 is connected to a light device 16. The light device 16 is illustrated as a standard pen light. The inner dimension of the light transmission element 14 is chosen to provide a snug fit over the standard components of the light device 16.

The light transmission element 14 is provided with a safety ring or cone 18 to enhance the safety of the device for small children. Each of the components of the assembly 10 can be provided with a "snap-fit" design, which allows various combinations of the light transmission element 14 to be snapped onto various configurations of the light device 16, allowing for several variations on a basic platform. The light device 16 could be disposable, provided with "replacement" confections, or merely find residual use as a flashlight.

Figure 2:
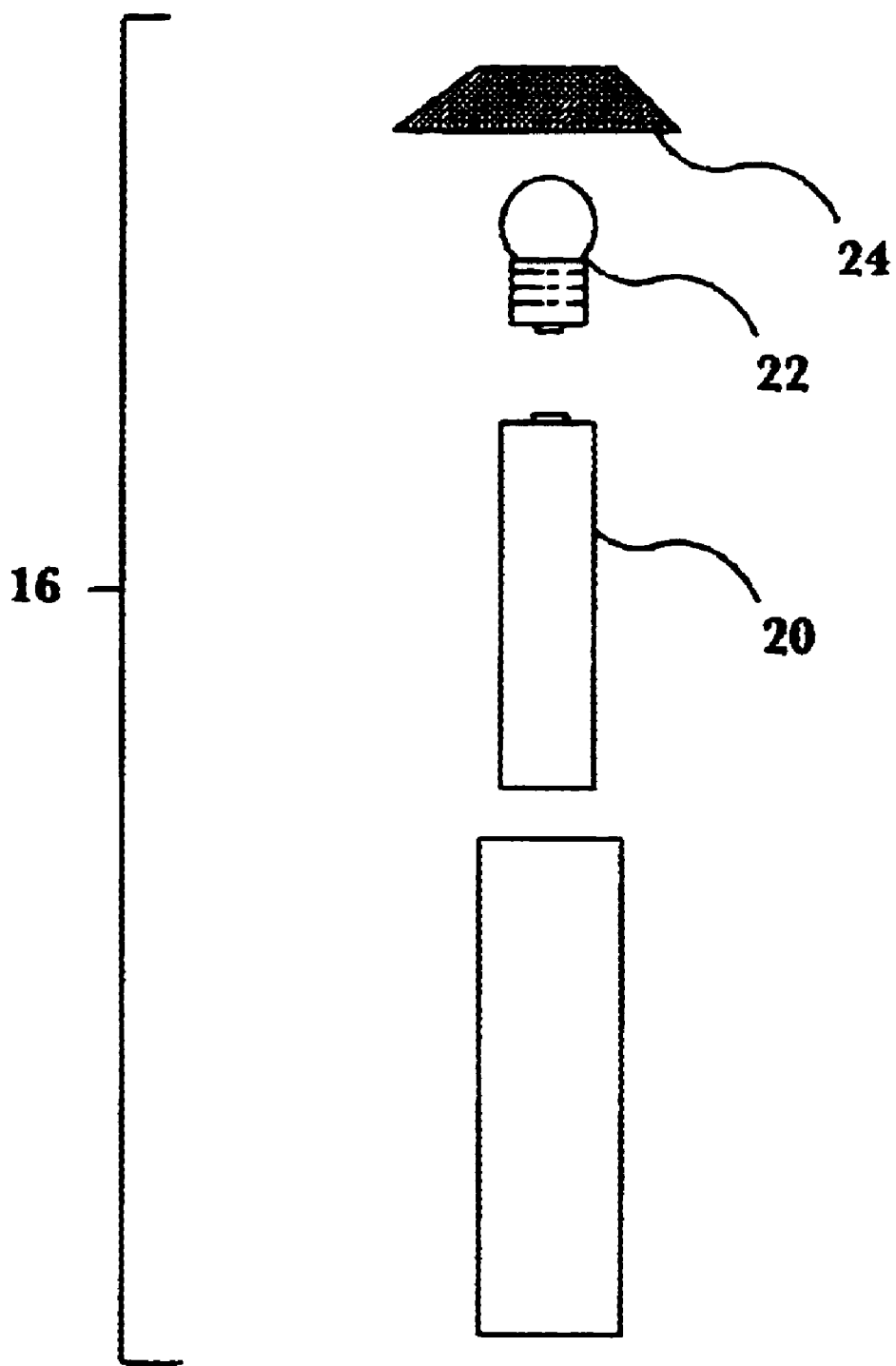
FIG. 2 schematically illustrates an exploded view of a light device

As shown in FIG. 2, the light device 16 also serves as a handle for the assembly 10. It is contemplated that the light device 16 would use a conventional power source, such as standard AA or AAA batteries 20. Other battery configurations could be utilized based on the market positioning and desired life of the light device 16. The light device 16 can be configured to use a standard incandescent bulb, LED, or any other suitable light-generating mechanism 22. In any event, the light device 16 advantageously should be prevented from any foreseeable shifting toward the confection 12. A transparent unbreakable nylon screen 24 is provided to inhibit the potential migration of particulate contaminants from the light device 16 to the confection 12.

The size of the light device 16 can be expanded to allow for enhanced heat dissipation. Another possible design for this section would call for small sized holes to allow for additional heat dissipation. There are other functional designs that could work well as a substitute for this particular section. For example, a mirror safety handle on top could give the midsection more of a diamond shape.

The light transmission element 14 can be affixed to the light device 16 by any suitable method, such as a glued or screw-threaded connection. Alternatively, the light transmission element 14 and the light device 16 can be molded as one piece. The light device 16 can include a switch 30, which can be provided as a "Turn Switch." The pivot or rotation to activate the switch would occur by twisting the safety handle opposing the housing base.

The specific dimensions of the assembly 10 can be varied in accordance with the size of the confection desired. It is contemplated that a suitable size would be in a range from 3.5–6 inches, with a spherical confection having a diameter of approximately 1.5 inches. Based upon the design of the edible top, just about design within reason could be utilized such as specific shapes like, animals, faces, fruit, logos virtually any shape or form that could be secured onto the top of the tube section.

Figure 4:
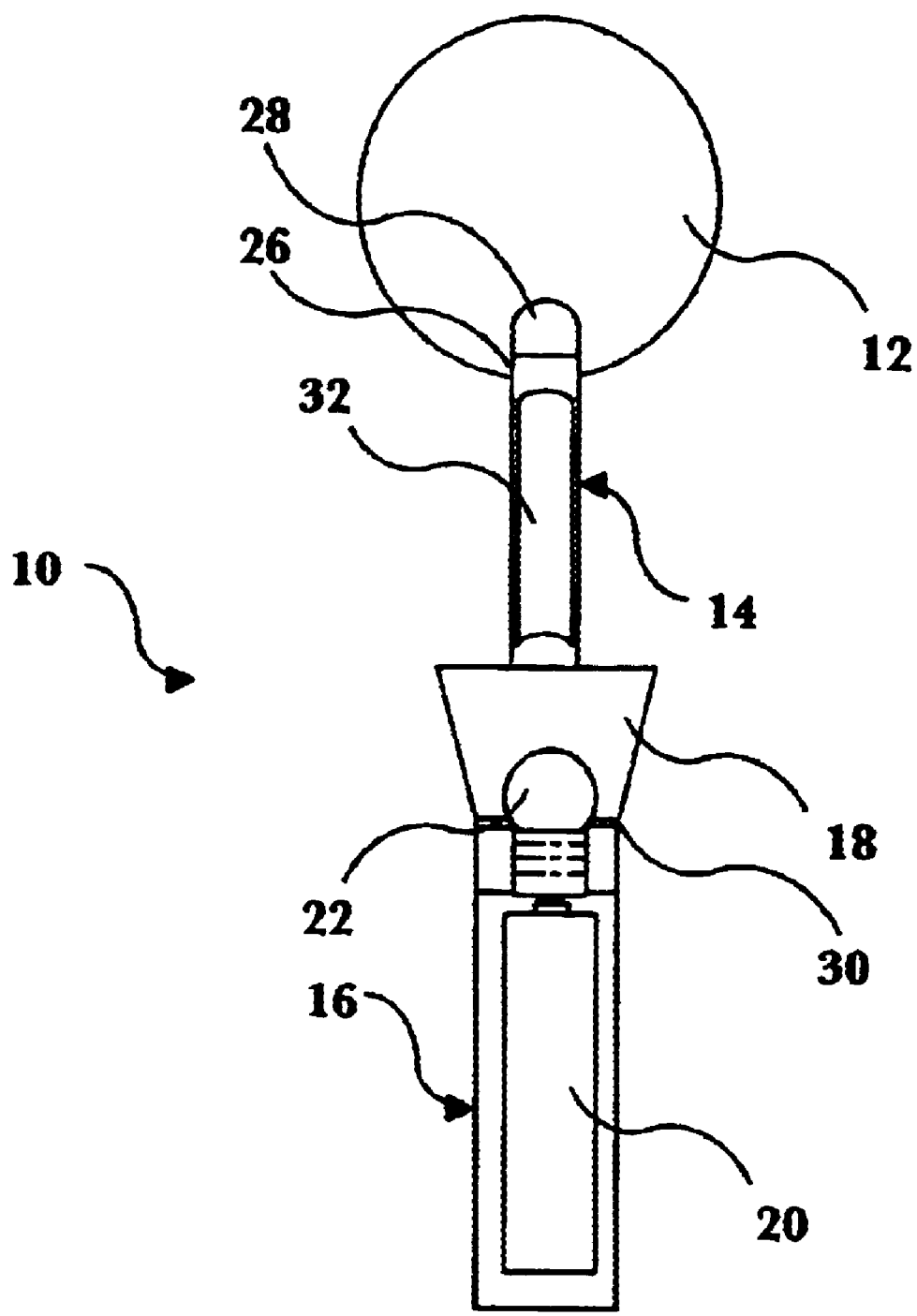
FIG. 4 illustrates a sectional view of a confection assembly.

The confection can include a mounting hole 26, as shown in FIG. 4. The mounting hole 26 is located at the bottom of the confection, here illustrated as having a depth of at least a quarter of an inch. The light transmission element 14 is inserted into the mounting hole 26, which is just slightly smaller then the diameter of the tube. An interior illumination hollow 28 is provided in the confection 12. The illumination hollow 28 allows better diffusion of the light from the light transmission element 14, thereby creating a more uniform luminous effect emanating from the confection 12. The confection 12 could also be opaque with holes or transparent or translucent portions, wherein the light emanates from the holes. The confection 12 could also contain indicia that would be illuminated.

Figure 3:
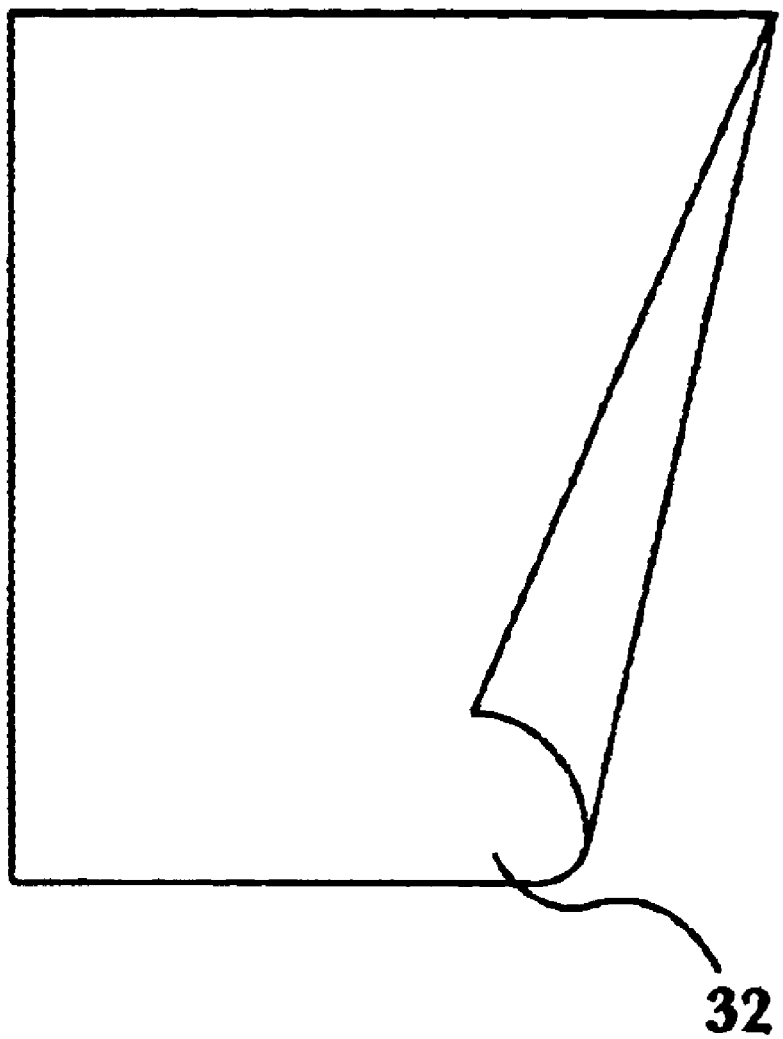
FIG. 3 illustrates a reflective sheet.

As shown in FIG. 3, a sheet 32 can be provided to be inserted in the light transmission element 14. The sheet 32 can be provided with a reflective "shiny" side, and a "paper" side containing indicia. The purpose of the shiny side of the foil is to act as a reflector for the light passing through. The paper side has two functional characteristics which are to act as creating tension against the rolling up of the foil and as a means to supply written information. The sheet 32 is rolled and placed inside the light transmission element 14 in the mid section. The shiny or reflect inside of the sheet would be placed on the inside surface, and the paper on the outside when rolled into position.

Figure 5:
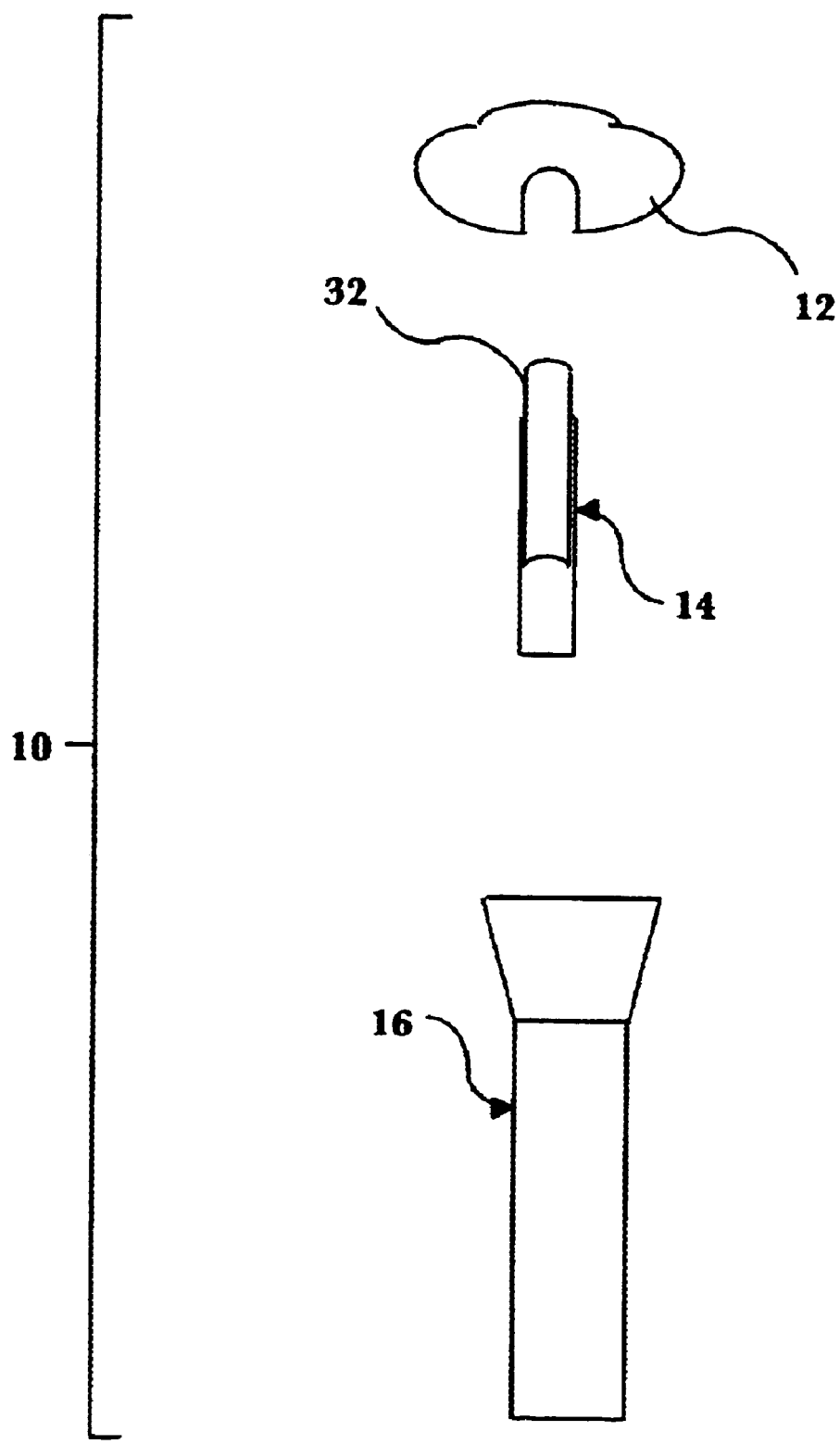
FIG. 5 illustrates a confection assembly after consumption of the confection.

FIG. 5 illustrates the potential "byproducts" after the consumption of the confection 12. The light transmission element 14 can be removed, leaving the light device 16 as a mini flashlight with a reflector at the end. Since the interior of the safety handle is able to have a reflective coating, the removal of the mid section tube will avail a separate and individual product. Once the consumer is finished with the candy, the flashlight is perfectly functional, providing enhanced value. The sheet 32 is capable of containing notes, coupons, or any type of print information that might help further market the product.

Figure 6:
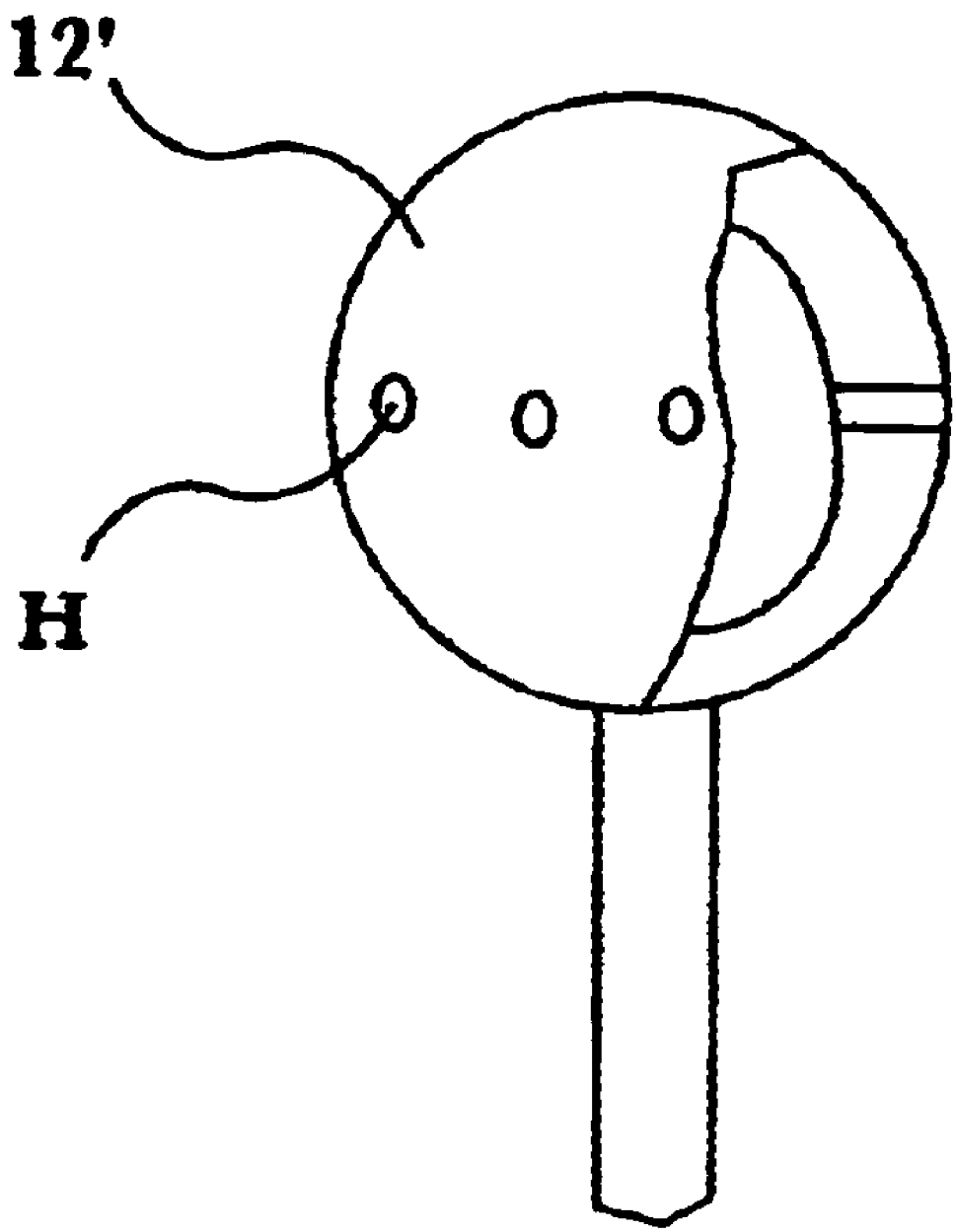
FIG. 6 illustrates an opaque edible confection.

FIG. 6 illustrates a confection 12' that is opaque with holes H. Light emanates from the holes H, which could alternatively be provided as transparent or translucent portions.

While details of the invention are discussed herein with reference to some specific examples to which the principles of the present invention can be applied, the applicability of the invention to other devices and equivalent components thereof will become readily apparent to those of skill in the art.

Accordingly, it is intended that all such alternatives, modifications, permutations, and variations to the exemplary embodiments can be made without departing from the scope and spirit of the present invention as set forth in the appended claims.

What is claimed is:

1. An illuminated confection assembly comprising the following:
    a light device;
    a light transmission element attached to the light device, the light transmission element including a reflective inner coating; and
    an edible confection attached to the light transmission element, the confection having an interior portion that is adapted and constructed to receive light from the light device via the light transmission element;
    whereby light from the light device passes from the interior portion of the confection to the ambient atmosphere.

2. An illuminated confection assembly in accordance with claim 1, wherein the edible confection comprises a transparent edible confection.

3. An illuminated confection assembly in accordance with claim 1, wherein the edible confection comprises a translucent edible confection.

4. An illuminated confection assembly in accordance with claim 1, wherein the edible confection comprises an opaque edible confection having light passages formed therein.

5. An illuminated confection assembly in accordance with claim 1, wherein the light transmission element comprises the following:
    a hollow tube; and
    a piece of indicia-bearing sheet material rolled up and slid inside the tube.

6. An illuminated confection assembly comprising the following:
    a light device;
    a light transmission element attached to the light device, the light transmission element including a hollow tube with a piece of indicia-bearing sheet material rolled up and slid inside the tube; and
    an edible confection attached to the light transmission element, the confection having an interior portion that is adapted and constructed to receive light from the light device via the light transmission element;
    whereby light from the light device passes from the interior portion of the confection to the ambient atmosphere.

7. An illuminated confection assembly in accordance with claim 6, wherein the edible confection comprises a transparent edible confection.

8. An illuminated confection assembly in accordance with claim 6, wherein the edible confection comprises a translucent edible confection.

9. An illuminated confection assembly in accordance with claim 6, wherein the edible confection comprises an opaque edible confection having light passages formed therein.

10. An illuminated confection assembly in accordance with claim 6, wherein the light transmission plement includes a reflective inner coating.

* * * * *